United States Patent [19]

Cory

[11] 4,449,734

[45] May 22, 1984

[54] MECHANICAL LOCKING OUTRIGGER HYDRAULIC JACK FOR AN OUTRIGGER ASSEMBLY

[75] Inventor: William W. Cory, Clear Lake, Iowa

[73] Assignee: Hydra-Jack, Inc., Clear Lake, Iowa

[21] Appl. No.: 395,995

[22] Filed: Jul. 7, 1982

[51] Int. Cl.[3] ........................ B66C 23/78; B60R 9/18; B66F 3/24

[52] U.S. Cl. ................................ 280/766.1; 212/189; 254/93 A

[58] Field of Search ............... 254/2 R, 2 B, 8 R, 8 B, 254/93 R, 93 H, 8 A; 212/189; 280/763.1–766.1

[56] References Cited

U.S. PATENT DOCUMENTS

| | | | |
|---|---|---|---|
| 2,483,312 | 9/1949 | Clay | 91/420 |
| 2,934,319 | 4/1960 | Wahlstrom | 254/93 A |
| 3,604,683 | 9/1971 | Sutton | 254/93 A |
| 3,702,181 | 11/1972 | Keller, Jr. et al. | 212/189 |
| 3,890,684 | 6/1975 | Tallman | 254/93 H |
| 3,904,177 | 9/1975 | Dalton | 254/93 A |
| 4,004,777 | 1/1977 | Despos | 254/93 A |
| 4,174,095 | 11/1979 | Chipman | 254/93 H |
| 4,318,550 | 3/1982 | Jacobsen | 280/766.1 |
| 4,330,104 | 5/1982 | Klok | 254/93 A |

FOREIGN PATENT DOCUMENTS

| | | | |
|---|---|---|---|
| 507284 | 11/1954 | Canada | 254/93 A |
| 45609 | 9/1956 | Fed. Rep. of Germany | 280/766.1 |
| 677847 | 8/1952 | United Kingdom | 254/93 A |

*Primary Examiner*—Trygve M. Blix
*Assistant Examiner*—R. B. Johnson
*Attorney, Agent, or Firm*—Williamson, Bains, Moore & Hansen

[57] ABSTRACT

A mechanical locking outrigger hydraulic jack for an outrigger assembly for use with cranes and the like includes vertically disposed cylindrical fixed and movable members, the fixed member being secured to a vertically disposed external sleeve. A variable extension chamber is defined by the interiors of the fixed and movable members. A variable retraction chamber is defined exteriorly of the fixed member and interiorly of the movable member. Valve means permit selective raising and lowering of the movable member. A locking nut threadedly engages the threaded exterior of the movable member and is engagable with an external surface of the locking sleeve to mechanically lock the movable member in an extended, lowered position.

1 Claim, 4 Drawing Figures

MECHANICAL LOCKING OUTRIGGER HYDRAULIC JACK FOR AN OUTRIGGER ASSEMBLY

SUMMARY OF THE INVENTION

This invention relates to an outrigger assembly and more particularly to a mechanically locking hydraulic jack for an outrigger assembly.

Some outrigger devices are hydraulically operated and include hydraulic jacks. It is not believed that the prior art hydraulic outrigger devices employ mechanical locking means for locking the hydraulic jacks in an extended operative condition. It will be appreciated that if no locking means is provided for a hydraulic outrigger device, failure of the hydraulic system could create a risk of potential injury or damage to the operator and the equipment.

It is a general object of this invention to provide a hydraulically operated outrigger device with a mechanical locking means, of simple and inexpensive construction, which is effective in locking the hydraulic jack of the outrigger device in an extended operative position.

A more specific object of this invention is to provide each of the hydraulic jacks of an outrigger device with a threaded nut-type locking member which engages a locking sleeve on the jack to lock the jack in an extended operative position.

These and other objects and advantages of the invention will appear more fully from the following description made in conjunction with the accompanying drawings wherein like reference characters refer to the same or similar parts throughout the several views.

FIGURES OF THE DRAWING

DESCRIPTION OF THE PREFERRED EMBODIMENT

Figure 1:
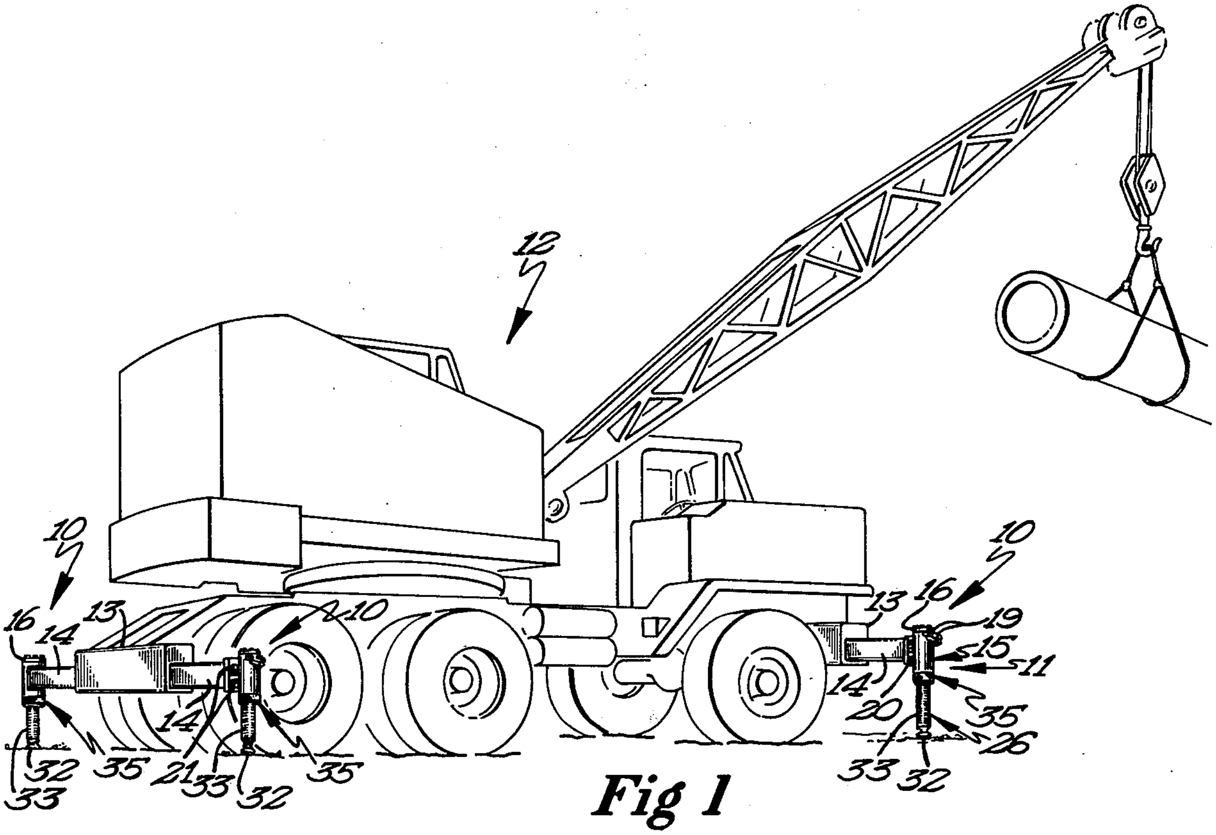
FIG. 1 is a perspective view of a crane which utilizes an outrigger device having the novel mechanical locking outrigger jacks.
Figure 4:
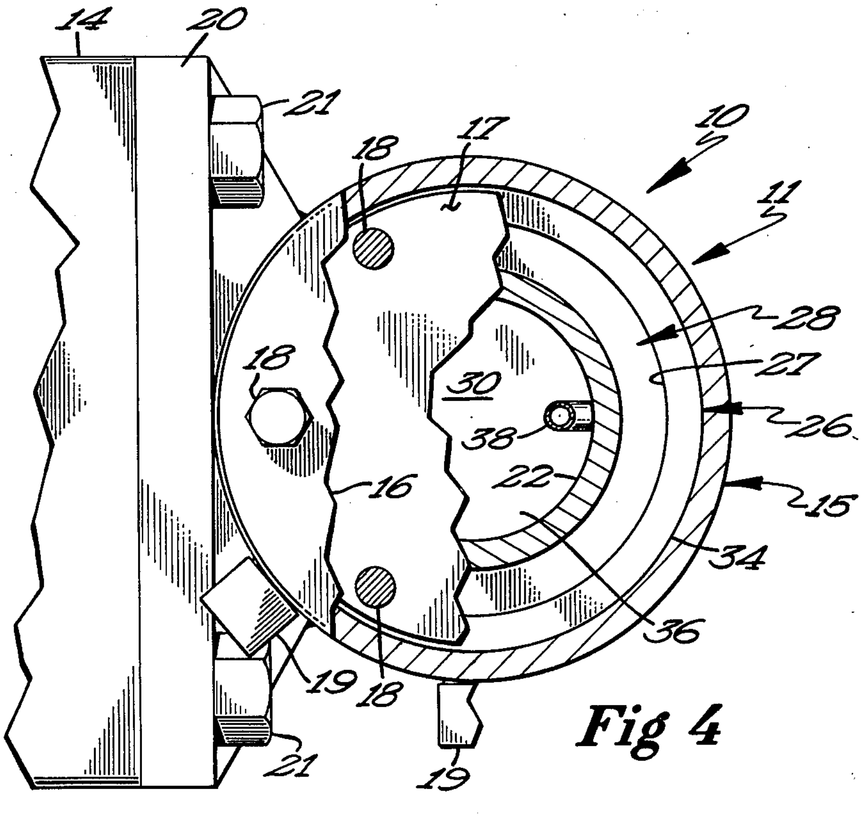
FIG. 4 is a top plan view of an outrigger jack with certain parts thereof broken away for clarity.

Referring now to the drawings, it will be seen that one embodiment of the mechanical locking jack, designated generally by reference numeral 10, is illustrated as a component of the hydraulic outrigger assembly 11. The hydraulic outrigger assembly 11 is generally of the kind used to stabilize a material handling vehicle, such as the crane 12. It will be noted that the crane 12 utilizes two outrigger assemblies, and each includes a housing 13 having a pair of arms 14 which are extensible and retractable relative to the associated housing. Each arm has a hydraulic jack 10 mounted at the outer end thereof.

Figure 2:
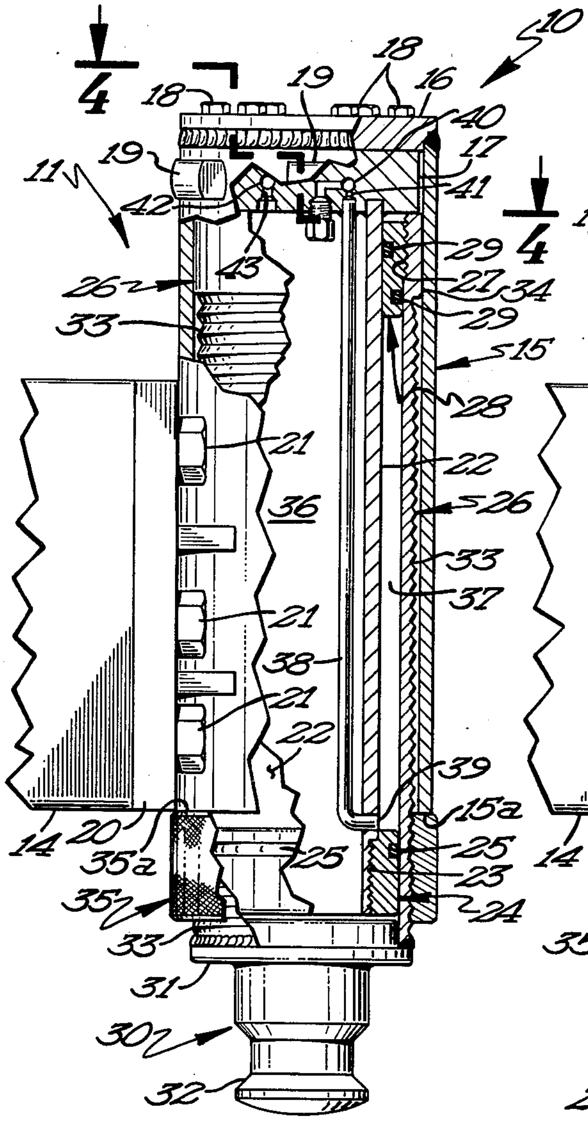
FIG. 2 is an elevational view of the novel hydraulic outrigger jack illustrated in a retracted, raised position and with parts thereof broken away for clarity.
Figure 3:
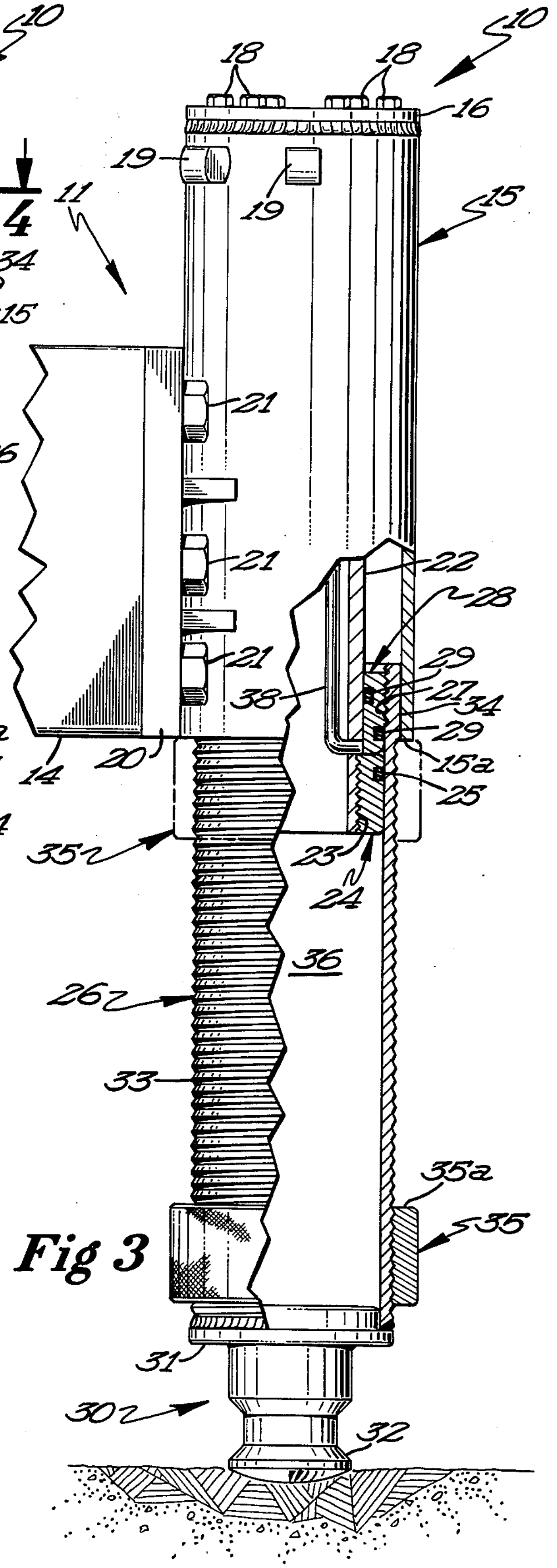
FIG. 3 is an elevational view taken approximately along line 3—3 of FIG. 1 and looking in the direction of the arrows.

Referring now to FIGS. 2 and 3, it will be seen that each hydraulic jack 10 includes an outer mounting and locking sleeve 15 which is of cylindrical construction and which is provided with an end cap 16 welded to the upper end thereof. A valve block 17 is secured to the end cap 16 by suitable bolts 18. The valve block 17 is provided with a pair of hydraulic fittings 19 which are connected to a source of hydraulic fluid under pressure. The locking sleeve 15 is also provided with a mounting bracket 20 which is secured to one end of the associated outrigger arm 14 by suitable bolts 21.

The hydraulic jack 10 also includes an elongate vertically disposed cylindrical fixed member 22 which is positioned interiorly of the locking sleeve 15 and which has its upper end secured to the valve block 17. The lower end portion of the fixed member 22 is externally threaded, as at 23, and is threadedly engaged by an internally threaded annular element 24. It will be seen that the annular element 24 projects radially outwardly beyond the external diameter of the fixed member 22 and is provided with an annular groove for accommodating and O-ring type seal 25.

The hydraulic jack 10 also includes an elongate vertically disposed movable cylindrical member 26 which is positioned interiorly of the locking sleeve 15 and is positioned exteriorly of the fixed member 22. It will be noted that the movable member is spaced radially outwardly of the fixed member 22 and is spaced radially inwardly of the locking sleeve 15. The upper end portion of the movable cylindrical member 26 is internally threaded, as at 27, and is threadedly engaged by and externally threaded annular element 28. The annular element 28 is provided with a pair of annular grooves therein for accommodating O-ring seals 29. It will be noted that one O-ring seal engages the external surface of the fixed member 22 and that the other seal 29 engages the interior surface of the movable cylindrical member 26.

A ground engaging member 30 is secured to the lower end of the movable member 26 and projects downwardly therefrom. The ground engaging member 30 includes a cap element 31 having a foot element 32 integral therewith and projecting downwardly therefrom. In the embodiment shown, the cap element is rigidly affixed to the lower end portion of the movable member, preferably by welding. The ground engaging member 30 is adapted to engage the surface of the ground when the jack 10 is in the extended operative lowered position. It is pointed out that a pad may be mounted on the foot element 32.

Referring again to FIGS. 2 and 3, it will be seen that the movable cylindrical member 26 is provided with external threads 33 throughout the major portion of its length. In this regard, it will be noted that the upper end portion of the movable member is provided with a smooth bearing surface 34 which projects radially outwardly slightly beyond the threads 33 and engages the inner surface of the locking sleeve 15. An internally threaded lock member or nut 35 threadedly engages the threads 33 on the movable member 26 and is movable axially longitudinally of the movable member.

The fixed member 22 and the movable member 26 cooperate with each other to define a variable extension chamber 36 and a variable retraction chamber 37. In this regard, the extension chamber is defined by the interior of the fixed member 22 and the interior portion of the movable member located below the annular element 24. The variable retracting chamber 37 is defined by the volumetric space located exteriorly of the fixed member and that interior portion of the movable member located above the annular element 24. It will be seen that when fluid under pressure is directed into the chamber 36, the movable member 26 will be extended to the lowered operative position so that the ground engaging member 30 will engage the surface of the ground. When fluid under pressure is supplied to the retraction chamber 37, the movable member will be retracted into the locking sleeve 15.

In this regard, a conduit 38 extends from the valve block 17 through the major portion of the fixed member 22 and is provided with an outlet 39 that communicates with the retracting chamber 37. The conduit 38 is connected to a passage 40 by means of a restricted orifice 41 in the valve block 17. The variable extension chamber 36 is connected in communicating relation to a passage 42 in the valve block 17 by means of a restricted orifice 43. Although not shown in the drawing, the valve block 17 is provided with valve means identical to that shown in the co-pending application Ser. No. 321,802, filed Nov. 16, 1981, and entitled Hydraulic Jack Device. The valve means disclosed in the co-pending application is incorporated herein by reference, thereby obviating the need to describe the construction and operation of the valve means.

At any rate, the valve means permits the movable member to be selectively extended to the position shown in FIG. 3 and retracted to the position illustrated in FIG. 2. It will be appreciated that while the movable member is illustrated in the fully extended position in FIG. 3, the movable member may be extended that amount necessary for the ground engaging member to engage the surface of the ground. In order to lock the hydraulic jack in a fail-safe type extended position, the annular locking member or nut 35 will be threaded upwardly from the position illustrated in FIG. 3, in full line configuration, to the position illustrated in dotted line configuration. It will be appreciated that the annular member will be moved downwardly to its lowermost position when it is desirable to retract the movable member to the raised inoperative position, as illustrated in FIG. 2. When this occurs, the movable member may be retracted into the locking sleeve until the upper annular edge 35*a* of the nut 35 engages the lower annular end edge 15*a* of the locking sleeve. When it is desirable to lock the hydraulic jack in the extended position, the locking nut will be threaded upwardly until the upper edge of the locking nut engages the lower edge 15*a* of the locking sleeve. When the locking nut is in this position, the hydraulic jack cannot collapse even if the hydraulic system fails.

It will be seen that the locking unit may be readily threaded to its unlocked or locked position along the movable member with a minimum of effort. The interaction of the locking sleeve with locking nut provides a simple but highly effective safe locking means for locking the jack in the extended position.

Thus it will be seen that I have provided a mechanical locking means for an outrigger jack which is not only of simple and inexpensive construction, but one which functions in a more efficient manner than any heretofore known comparable means.

While the preferred embodiments of the present invention have been described, it should be understood that various changes, adaptions and modifications may be made therein within departing from the spirit of the invention and the scope of the appended claims.

What is claimed is:

1. In a crane including a housing, outrigger arms extendably and retractably mounted in said housing, an outrigger assembly comprising:

(a) A vertically disposed cylindrical locking sleeve, said sleeve being open at it lower end, a cap fixed to and closing the upper end of said sleeve, means for connecting said sleeve to an associated one of said outrigger arms, a valve block located within said sleeve at the upper end thereof, means for attaching said valve block to said cap;

(b) a first elongated vertically disposed cylindrical member fixed at it upper end to said valve block, said cylindrical member having an open lower end, first annular element fixed to and surrounding said lower end of said cylindrical member and projecting radially outwardly therefrom;

(c) a second elongated vertically disposed cylindrical member movably mounted in said sleeve, said second member having of a larger diameter than said first member and being concentrically disposed about said first member, means attached to the lower end of said second member for engaging a crane supporting surface, said second member having a closed lower end formed by said means for engaging a crane supporting surface, a second annular element fixed to the upper end of said second member and engageable with the external surface of said first member to form a fluid seal between said members, annular bearing means mounted at the upper end of said second member for engagement with the internal surface of said locking sleeve;

(d) a variable extension chamber defined by the interior volume of said first member and the interior volume of said second member that is located below said first annular element, a variable retraction chamber defined by the annular volume between said members located above said first annular element;

(e) means in said valve block for directing pressurized fluid to a a selected one of said chambers for extending or retracting said second member relative to said sleeve, said fluid direction means including a first orifice, conduit means extending from said orifice through the major portions of the length of said first member to said retracting chamber, passage means with an orifice in communication relationship with said extension chamber;

(f) said second member including threads on the external surface throughout the major portion of its length, said threads being located radially inwardly of said bearing means, a lock nut threadedly engaging said threads and movable longitudinally along said second member to a position to engage the lower end of said locking sleeve to support said second member in an extended postion.

* * * * *